Patented Jan. 5, 1937

2,066,710

UNITED STATES PATENT OFFICE 2,066,710

PURIFICATION OF WATER AND OTHER LIQUIDS

Atilio Antonio Manuel Bado, Buenos Aires, Argentina

No Drawing. Application November 25, 1933, Serial No. 699,803. In Argentina August 22, 1933

2 Claims. (Cl. 99—220)

The present invention relates to a product which is suitable for the bacteriological purification of waters and liquids in general and to the process for the manufacture thereof.

This new product is constituted by aluminous-calcium silicates or silicates in general, which allow the obtention of combinations either chemical or by adsorption (with or without alkaline or alkaline-terrous or earth metals) with the metallic salts which will be added in the manner indicated.

The silicates which appear to be best suited for the treatment are the products of the manufacture of Portland cement called "clinker"; these are reduced to grains of convenient size and macerated (even cold) in solutions of nitrate of silver, copper or any other metal which it is desired to fix to the silicates in chemical and/or adsorption combination.

The duration of this maceration may vary to increase or decrease the percentage of silver or other metal to be transferred to the silicates; said percentage may be of over 1%, according to the nature of the product and the concentration of the solutions employed. Eight to twenty hours are sufficient.

The new product is obtained once the metal is fixed to the granulous particles, the thus coated particles being used later for the purification of waters by filtering through layers of different thickness of the product or mixture of the product with sand or other granulous material.

It should be understood that the scope of this invention is not affected by the conditions in which the treatment takes place or by the variation of the materials employed, which fundamentally are silicates and solutions of metallic salts in general.

Having now particularly described and ascertained the nature of my invention, and in what manner the same is to be performed, I declare that what I claim is:—

1. Process for the manufacture of a product for the sterilization and filtering of liquids, consisting in granulating into grain size clinker of industrial cement, and macerating said clinker in a cold solution of metallic nitrates, the metals for said nitrates being selected from a group consisting of silver and copper; whereby the metals become fixed on the granulous particles of said clinker constituting the sterilizing and filtering product.

2. Process for the manufacture of a product for the sterilization and filtering of liquids, consisting in granulating into grain size clinker of industrial cement, and macerating said clinker in a cold solution of metallic nitrates, the metals for said nitrates being selected from a group consisting of silver and copper; whereby the metals become fixed on the granulous particles of said clinker constituting the sterilizing and filtering product, the duration of such maceration being between 8 and 20 hours.

ATILIO ANTONIO MANUEL BADO.